F. Peabody.
Mower.
Nº 12963 — Patented May 29, 1855.
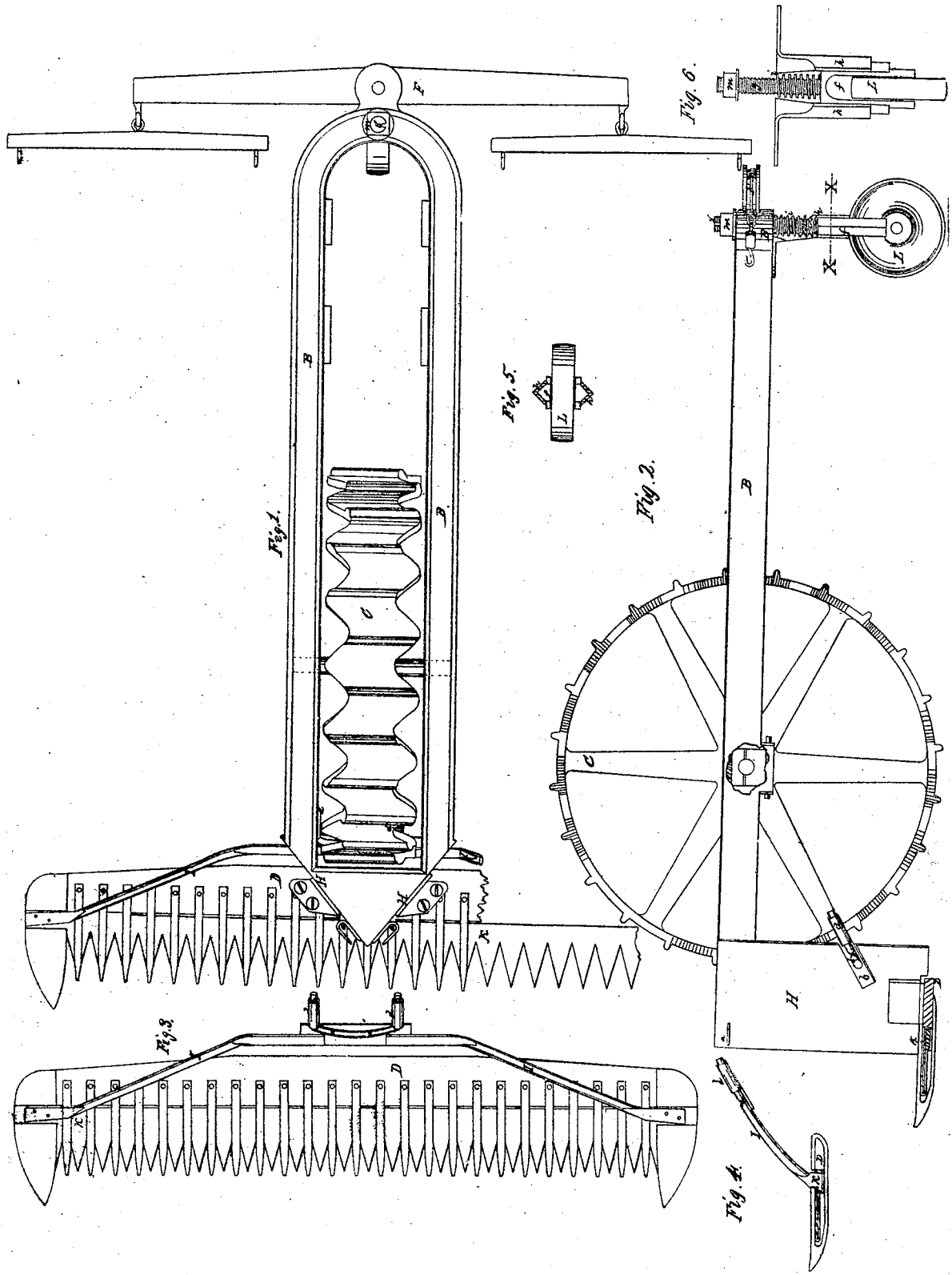

UNITED STATES PATENT OFFICE.

FRANCIS PEABODY, OF SALEM, MASSACHUSETTS.

IMPROVED GRASS-HARVESTER.

Specification forming part of Letters Patent No. 12,963, dated May 29, 1855.

*To all whom it may concern:*

Be it known that I, FRANCIS PEABODY, of Salem, in the county of Essex and State of Massachusetts, have invented certain new and useful Improvements in Mowing-Machines, of which the following is a full, clear, and exact description, reference being had to the annexed drawings, in which—

Figure 1 is a plan of a mowing-machine with my improvements attached; Fig. 2, a side view of the same; Fig. 3, a plan of the cutter-bar and the attachments by which it is vibrated; Fig. 4, an end view of the same; Fig. 5, a section on the line X X of Fig. 2; Fig. 6, an end view of the spring-regulator.

In the mowing and reaping machines heretofore constructed the horses have been placed in one or other of two positions, either they have been harnessed to the rear of the machine with their heads turned toward it, and have pushed it forward as they followed behind it, or else they have been harnessed in advance of the machine, and in such cases it has become necessary to place the cutters entirely to one side of the driving-wheel, that the uncut grain may not be trodden down by the horses. Both of these positions of the horses for well-known reasons are objectionable. In the latter case, the work being all thrown upon one side of the wheel, a side drag is produced upon the team, which creates considerable friction and loss of power. In the former case, when the horses are placed behind the driving-wheels they are removed to such a distance from their work that they act very disadvantageously, and it is furthermore difficult to train horses to advance with a noisy machine directly in front of them.

To remove these and other difficulties is the object of the first part of my present invention, which consists in placing the horses one upon each side of the driving-wheel, in advance of which the cutters are placed, as will be hereinafter described.

In the accompanying drawings, B is the frame of the machine; C, the driving-wheel; D, the cutter-board placed in advance of the driving-wheel, its distance from the surface of the ground being regulated by means of a spring-regulator, which will be presently described.

F is the single-tree to which the horses are harnessed, they being placed one upon each side of the driving-wheel, the pole-straps being attached to the hooks *a*. By this arrangement of the horses and the cutters it will be perceived the side drag, before mentioned, upon the team is entirely avoided and a great saving of friction and power is effected, in addition to which the horses are brought more immediately up to their work, and consequently the shake or irregular motion of the cutters, which might be produced by the motion of the horses, is greatly diminished. In smaller machines, where but one horse is employed, it is contemplated to place him at the side of the driving-wheel, in the position which one of the horses now occupies in the double-team machines. In such case should there still be a slight side drag upon the horse, this may be entirely removed by causing the cutter-board to project slightly farther from the center of the machine upon the side toward the horse than upon the other, which would effectually remedy the evil, should it be found to exist.

The great loss of power produced by the means heretofore adopted for the purpose of gearing up from the driving-wheel for the purpose of communicating a rapid motion to the cutters has hitherto proved a serious drawback to the introduction of mowing-machines into general use, and various plans have been tried to obtain this speed and diminish the number of wheels in the train. The situation of the cutters relatively to the wheels and shafting has hitherto required the power which vibrates the cutters to be applied to one end of the cutter-bar. This causes the blades at the opposite end to spring and operate with a jerking motion, thereby consuming power unnecessarily and producing imperfect work.

The second part of my invention has for its object the removal of this defect, and consists in attaching the connections which communicate the vibrating motion to the cutters to each end of the cutter-bar, or to the middle thereof, and in certain arrangements of the parts of the machine in combination therewith, whereby greater steadiness of motion is obtained and the machinery is much simplified. This part of my invention will now be described.

To the forward end of the frame of my machine I attach an angular mold-board or screen, H, which descends nearly to the surface of the ground. To the bottom of this mold-board I attach the cutter-board D, as seen in the drawings. Within the space inclosed by this mold-board, which is covered in at the top to within a short distance of the driving-wheel, are inclosed the parts which receive the vibratory motion from the wheel C and communicate it to the cutter-bar, whereby they are protected from being impeded in their operation by the grass, with which they would otherwise be constantly covered.

I is a bent bar, the ends of which are attached to the opposite ends of the cutter-bar K, as seen in Figs. 1, 3, and 4. This bar passes through openings $b$, and carries at its center two friction-rollers, $d$, which are made to bear against the undulating edges of the driving-wheel, by which means the cutter-bar is rapidly vibrated as the machine advances. The grass which is cut by the knives in the center of the machine, being guided off upon each side by the mold-board, is not passed over by the driving-wheel. In lieu of the friction-rollers $d$, operated by the undulating edges of the driving-wheel, I propose sometimes to drive the cutters by means of a single crank actuated by a pinion which receives its motion from cogs upon the driving-wheel. This, however, forms no part of my present invention.

The third part of my invention consists in the application to the tail of the machine of a spiral-spring regulator, which forms an adjustable yielding support to this portion of the machine and regulates the cutters in front to the exact height of the clip required, and enables them to surmount any moderate obstacles presented to them. This regulator is seen detached in Fig. 6.

L is a roller which runs in the fork $f$. This fork is attached to the upright screw-rod $g$, and slides freely up and down in the ways $h$. The spring $i$, which surrounds the rod $g$, bears against the fork $f$, and also against the under side of the frame B. By means of the nut $m$ the roller is raised or depressed, as may be required, to regulate the distance of the cutters from the surface of the ground, the spring $i$ yielding, as before mentioned, to permit the cutters to pass over any moderate obstacles which they may encounter. When passing to or from the field the tail of the machine may be sufficiently depressed by means of this spring-regulator to enable the cutters entirely to clear the ground.

What I claim as my invention, and desire to secure by Letters Patent, is—

1. Placing the horses at the side of the driving-wheel, as described, when the cutters are placed in front thereof, in the manner and for the purpose herein set forth.

2. The mold-board H, in combination with the device employed for the purpose of vibrating the cutter-bar, when this device is placed immediately behind the mold-board and in connection with the cutter-bar, by attachments either to the center or to both ends of the same, whereby a steadier motion of the cutter-bar is produced, and the parts which transmit the motion from the driving-wheel thereto are covered and protected from being clogged by the grass, in the manner set forth.

3. The within-described spring-regulator, constructed and operating in the manner substantially as herein described, for the purpose of adjusting the distance of the knives from the ground, as set forth.

FRANCIS PEABODY.

Witnesses:
 SAM. COOPER,
 JOHN S. CLOW.